United States Patent [19]
McGuffin

[11] 3,882,498
[45] May 6, 1975

[54] ADAPTIVE ARRAY PROCESSOR PROVIDING IMPROVED MAINLOBE MAINTENANCE

[75] Inventor: August L. McGuffin, Clinton, N.Y.

[73] Assignee: General Electric Company, Utica, N.Y.

[22] Filed: Feb. 22, 1973

[21] Appl. No.: 334,519

[52] U.S. Cl. ............ 343/7 A; 343/7.7; 343/100 CL
[51] Int. Cl. ............................................. G01s 9/42
[58] Field of Search ............... 343/7 A, 7.7, 100 CL

[56] References Cited
UNITED STATES PATENTS

| | | | |
|---|---|---|---|
| 3,202,990 | 8/1965 | Howells | 343/100 CL |
| 3,208,065 | 9/1965 | Gutleber et al. | 343/100 CL |
| 3,725,922 | 4/1973 | Brennan et al. | 343/7.7 X |
| 3,727,220 | 4/1973 | Brennan et al. | 343/7 A |

Primary Examiner—Malcolm F. Hubler

[57] ABSTRACT

In an AMTI adaptive array, each array antenna element is connected to an element circuit which multiplies the contribution of each antenna element to the total return by a weight. The element circuits and further signal processing circuitry comprise the array processor. The element circuits include well-known cross correlator control loops. In accordance with the present invention, a signal whose pulse repetition interval to pulse repetition interval doppler phase shift is 180° out of phase with clutter returns is supplied to a control loop. Thus even with clutter at or near the look angle, mainlobe gain is maintained. Consequently, a "two pulse" MTI circuit utilizing a single delay line in each element circuit may be utilized rather than a two delay line element circuit which would normally be required to provide a signal to noise ratio value indicative of mainlobe gain which would be required for compatability with further MTI processing circuitry.

1 Claim, 5 Drawing Figures

3,882,498

ADAPTIVE ARRAY PROCESSOR PROVIDING IMPROVED MAINLOBE MAINTENANCE

BACKGROUND OF THE INVENTION

This invention relates to moving target indicator radar systems and more particularly to AMTI adaptive arrays.

In an adaptive array antenna, contributions of individual antenna elements to a total output signal are delayed with respect to one another and multiplied by complex multiplicative weights in order to adjust the phase and amplitude of signals received from each antenna element. This complex weighting inter alia, provides for control of the receive phase center of the array. In other words, the electrical center of the array can be moved to adjust for pulse to pulse differences in the distance traveled by returned pulses due to motion of a radar platform aircraft. In order to perform this function, each antenna element is connected to what may be termed for purposes of the present description an element circuit. Element circuit includes a wellknown cross correlator control circuit including a delay line providing a delay equal to one pulse repetition interval. The delayed and undelayed returns are each multiplied by a weighting function, each of which is the output of a separate control loop. The outputs of the control loops are connected to a summation circuit in which returns indicative of nonmoving signals such as clutter, i.e. ground returns, and externally generated noise are cancelled. In one form of adaptive array, a mainlobe filter is provided to interact with each element circuit to provide degenerative feedback to the control loop providing degenerative control loop gain for weighting received signals received from a desired interval about the look angle. Consequently, a desired null is provided at angles off the look angle where such undesired returns appear. Additionally, a different form of feedback loop is provided from the output of the summing circuit to the control loops to control the gain of all the element circuits. A fuller discussion and mathematical analysis of this operation is found in A. L. McGuffin, *Adaptive Antenna Compatibility With Radar Signal Processing*, paper presented at Antenna Array Conference, Naval Electronics Laboratory Center, San Diego, Calif., Feb. 22–24, 1972 (technical publication SI-514, copies available from Manager-Technical Publications, Aerospace Electronic Systems Department, General Electric Company, Utica, N.Y. 13503).

In order to provide for provision of an output signal from the array processor which is compatible with, i.e. useful for further radar signal processing circuitry, mainlobe gain with respect to side lobes must be maintained even in the presence of clutter and externally generated noise on or about the look angle. One means of providing this operation is a "three pulse" or two delay line element circuit. Signals are processed as described above. However, first order cancellation utilizing only one delay line in each element circuit does not provide sufficient clutter rejection to avoid degraded performance due to the presence of a degree of clutter in the summing circuit feedback. Under these conditions, a conventional adaptive array processor reduces the mainlobe gain, causing a loss of signal power (or lower signal-to-noise ratio), and incompatibility with further AMTI processing circuitry. In other words, for an array of 20 antenna elements, an array processor including 40 delay lines and 60 multiplier loops would be required. It should also be noted that adaptive processing has been provided in less complicated non AMTI processors. However, while such circuits provide for weighting of signals from antenna elements to provide mainlobe maintenance in the presence of externally generated noise, the moving target indicator function is not provided. It is recognized that complexity of adaptive AMTI processors increases cost and decreases reliability. Furthermore, size and weight are always at a premium for airborne radar even for large aircraft. It is therefore desirable to decrease the size and weight of an array processor.

SUMMARY OF THE INVENTION

It is therefore an object of the present invention to provide an adaptive AMTI array processor which is simplified in construction.

It is a further object of the invention to provide an array of the type described which may be constructed having only one delay line in each element circuit while maintaining the capability of maintaining receive mainlobe amplitude above receive side lobe amplitude even in the presence of clutter at or near the look angle.

It is a further object of the present invention to provide an array processor of the type described utilizing element circuits of the type described including a summing circuit connected to a conventional AMTI cancellation circuit, whereby an array processor providing mainlobe gain and clutter cancellation is provided.

It is also a specific object of the present invention to provide an adaptive AMTI processor including element circuits each including only one delay line which processor is capable of maintaining mainlobe gain for compatability with further signal processing circuitry.

Briefly stated, in accordance with the present invention, there is provided an AMTI adaptive array processor including a plurality of single delay line element circuits providing outputs to a summing circuit. Each element circuit includes cross correlator control loops for multiplying delayed and undelayed signals. In accordance with the present invention, the equivalent of a signal which is 180° out of phase with clutter doppler phase shift and which synthesizes a signal representative of a group of targets near the look angle is coupled to modify the correlator control loop gain, whereby loop gain is adjusted to maintain mainlobe gain even in the presence of clutter at or near the look angle. The output of the summing circuit is connected to a conventional AMTI canceller circuit. Consequently, the AMTI canceller circuit provides a signal in which mainlobe gain is maintained and clutter is cancelled for compatibility with further signal processing circuitry.

BRIEF DESCRIPTION OF THE DRAWING

The means by which the foregoing objects and features of novelty are achieved are pointed out with particularity in the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENTS

Figure 1:
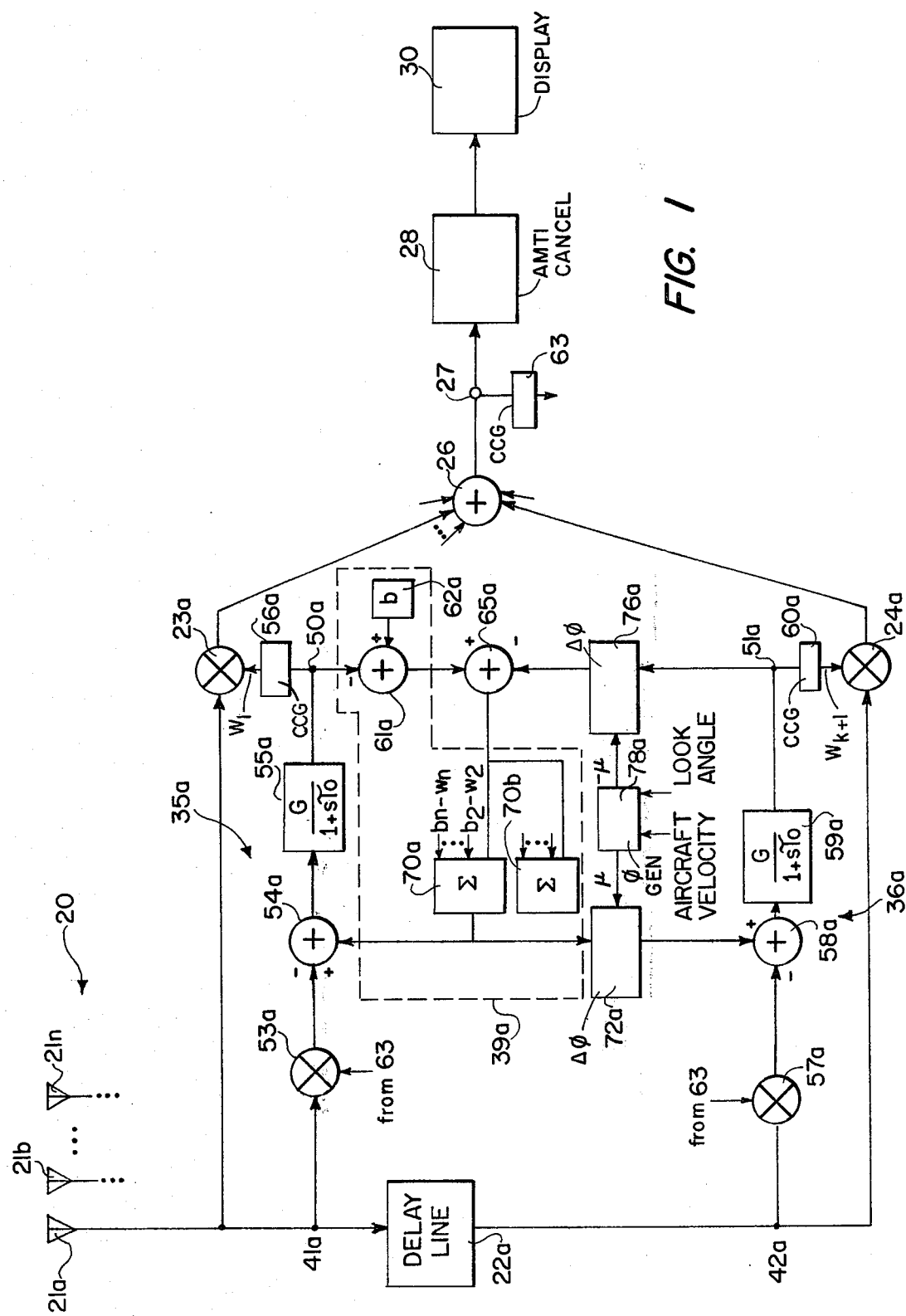
FIG. 1 is a block diagrammatic representation of an adaptive array constructed in accordance with the present invention utilizing a mainlobe filter interconnected with each cross correlator control loop feedback circuit.

Referring now to FIG. 1 there is illustrated a system constructed in accordance with the present invention for connection to an antenna 20. The antenna 20 consists of a plurality of elements, 21a, 21b, ... 21n. Each antenna element is associated with an element circuit a, b, ... n. The antenna element circuit a is shown in full, and the remainder of element circuits are indicated by means of dotted lines for simplicity of the drawing. The other element circuits may be identical to the element circuit a. For purposes of this description, the components of each element circuit are referred to by a numeral only. In the drawing, the component bearing the same letter designation is associated with the antenna element circuit having the same letter designation. An antenna element 21 is connected to an element circuit including a delay line 22 providing a delay of one pulse repetition interval.

An undelayed return in an element circuit is multiplied by a multiplier 23, and a delayed return is multiplied by a multiplier 24. All of the multipliers 23a, 23b, ... 23n and 24b, ... 24n are connected to one summing circuit 26. The summing circuit 26 has an output terminal 27 referred to as an interface terminal 27 for purposes of the present description. The interface terminal 27 is connected to a conventional moving target indicator canceller circuit 28 which has an output for coupling to further processing circuitry comprising utilization means 30 which may comprise display circuitry or other processing circuitry. The antenna element circuit includes cross correlator control loops 35 and 36. The cross correlator control loop 35 has an input at a terminal 41a at the input of the delay line 22, and the cross correlator control loop 36 has an input at a terminal 42 at the output of the delay line 22. Feedback is provided to the cross correlator control loops 35 and 36 by a circuit 39 described further below which is similar to a mainlobe filter but operates differently in accordance with the present invention as described below. Feedback is also provided from the interface terminal 27 to all of the cross correlator control loops 35a, 35b, ... 35n and 36a, 36b, ... 36n, as described below.

The terminal 41 is connected to a first input of the multiplier 23 to provide the signal which is multiplied by a weight $W_1$ appearing at the other input of the multiplier 23. A multiplier 53, an adder 54 and filter 55 are connected in series from the terminal 41 to a terminal 50. A complex conjugate generator (CCG) 56 is connected from the terminal 50 to the other input of the multiplier 23. The output of the multiplier 53 is connected to a subtractive input of the adder 54. Similarly, in the control loop 36, the terminal 42 is connected to the first input of the multiplier 24 to provide the signal which is multiplied by a weight $W_{K+1}$ appearing at the other input of the multiplier 24, where $W_{K+1}$ is indicative of a weight for a signal delayed by one pulse repetition interval. A multiplier 57, adder 58, and filter 59 are connected in series from the terminal 42 to a terminal 51. The output of the multiplier 57 is connected to a subtractive input of the adder 58. A complex conjugate generator 60 is connected between the terminal 51 and the other input of the multiplier 24. Where signal values are expressed in polar terms, complex conjugate generator provides an output phase of $-\phi$ where an input phase is $\phi$. The outputs of the multipliers 23 and 24 are connected to the summing circuit 26 at which an output from which a large part of the clutter has been subtracted or "cancelled" is provided at the interface terminal 27. The interface terminal 27 is coupled by a complex conjugate generator 63 to second inputs of the multipliers 53 and 57 to control overall system gain responsive to overall clutter remaining in the received signal. The basic technique performed by a cross correlation control loop is further defined in U.S. Pat. No. 3,202,990 to P. W. Howells issued Aug. 24, 1965 and assigned to General Electric Company, the assignee herein.

As to non-AMTI adaptive processing techniques, feedback indicative of angular relationships is provided by comparing weights generated by the control loops 35 and 36 utilizing an adder 61 having a subtractive input connected to the terminal 50 and an adding input connected to a reference vector element generator 62 providing a reference vector element b. In a prior art arrangement, differences indicative of the weights and the reference levels are coupled by a summation circuit 70 which has inputs provided thereto from all of the summing circuits 61a, 61b, ... 61n to provide an output indicative of the summation of the differences in each element circuit between the respective weights $W_1, W_2, \ldots W_n$ and the respective reference vector elements $b_1, b_2, \ldots b_n$ to provide degenerative feedback in the control loops 35 and 36. A similar function is provided in the present circuit.

The magnitude of target returns is small compared to clutter and may also be small compared to other externally generated noise. Clutter may be present in all radar range cells from which returns are received, but target returns are generally received from one or a few range cells. Therefore, adaptive array control loops circuits operate to reject received signals, particularly continuous high energy signals, except when such signals are from the direction of arrival of the assumed target angle. A single assumed target angle is usually designated by a computed vector in conventional adaptive arrays. The circuit 39 operates to provide weighting feedback from the summation circuit 70 to reduce control loop gain for returns from a desired angular interval about the look angle. With reduced control loop gain, the tendency of the array processor to reject all returns from the desired angular interval about the look angle is reduced. In the context of the present embodiment, the adder 65 and circuit 39 comprise a mainlobe filter.

In accordance with the present invention, doppler of the desired signals (assumed targets) as well as a range of assumed target direction is accounted for to provide an improved AMTI adaptive processor. An adder 65 is provided having an input connected to the output of the adder 61. The output of the adder 65 is connected to the input of the summation circuit 70. Inputs are provided from each of the adders 65a, 65b, . . . , 65n to the summation circuit 70. The output of the summation circuit 70 is connected to the adding input of the adder 54. The output of the summation circuit 70 is also connected to a phase shifter 72 having an output connected to the adding input of the adder 58. A phase shifter 76 is connected between the terminal 51 and the subtracting input of the adder 65. (The summation circuit 70b is also shown to further illustrate provision of signals to the circuits 39b, 39c, . . . 39n.)

The phase shifters 72 and 76 are variable phase shifters, one providing a phase shift which is the negative of the other. The phase shifts of the phase shifters 72 and 76 are chosen to correspond at least approximately to the pulse repetition interval to pulse repetition interval (PRI) phase shift of a target. It is important to note that the selection of the values of phase shift provided by the phase shifters 72 and 76 need not be exact. It has been found that where the target is at or near the look angle, it may be assumed that the pulse repetition interval to pulse repetition interval (PRI) phase shift (phase difference between a return signal appearing at the output of an antenna element and the return signal representing the same object appearing at the output of the delay line 22a) of a target signal is 180° out of phase with that of clutter. Therefore, a value of phase shift for the phase shifters 76 and 72 is selected which is approximately 180° out of phase with the clutter doppler phase shift from PRI to PRI. This value is selected based on aircraft velocity and look angle and the input symbols $\mu$ and $-\mu$ to the phase shifters 72a and 76a indicate that the variable phase shifters 72a, 72b . . . 72n and 76a, 76b, . . . 76n are provided with inputs from a phase shift signal generator 78 which includes conventional transducers for selecting the angle $\mu$. This circuitry may thus be referred to as assumed target means.

When the weighting signals from terminals 50 and 51 are indicative of the presence of received clutter, the values provided to the adder 65 are processed by weighted summation circuits 70a, 70b, 70c . . . 70n to form the desired feedback to adders 54 and 58. This feedback, due to the phase shifts $\mu$ and $-\mu$ as well as the structures of 70a, 70b, . . . 70n, affects the combined performance of all control loops 35 and 36. The phase shifter 72 restores doppler phase shift of the component of the output of the summation circuit 70 due to input from the phase shifter 76 for adding in the control loop 36. The result is that the processor is constrained not to attenuate (i.e., cancel) signals having the approximate PRI to PRI doppler phase shift of the assumed target and a direction of arrival within the assumed target angular interval. Consequently, mainlobe gain is maintained for desired signals. Also the AMTI cancellation of clutter (by the element circuits in conjunction with the summing circuit 26 and by conventional AMTI canceller circuit 28) is permitted.

Figure 2:
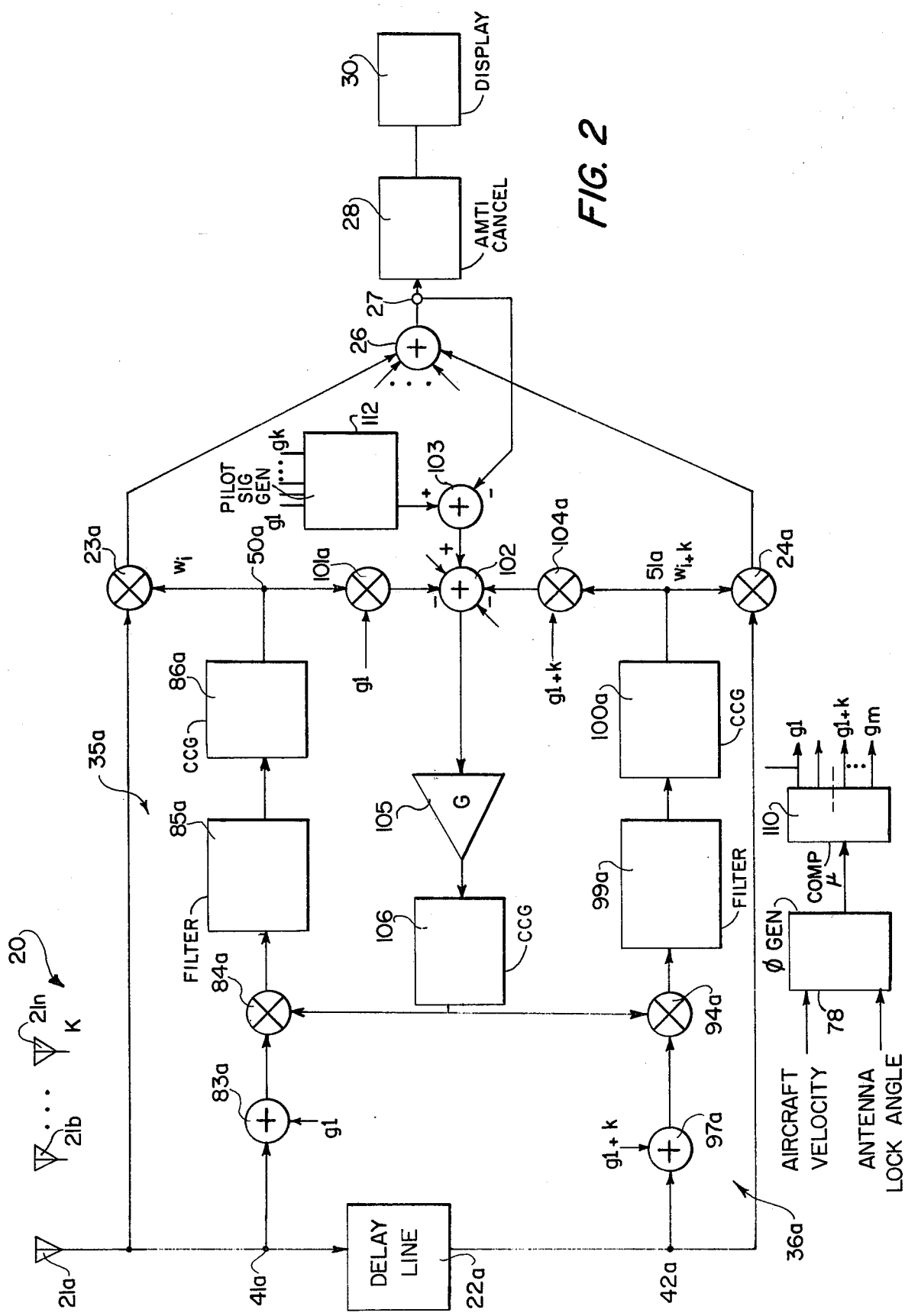
FIG. 2 is a schematic representation of an AMTI adaptive array "pilot signal" embodiment.

FIG. 2 is a schematic illustration of a "pilot signal" embodiment of the present invention. A pilot signal is an input to the adaptive array processor circuits which incorporates a summation of the elements of a pilot vector generated based on assumed target angles. The vector element $gi$ for each element circuit is multiplied by a reference vector element $bi$ for each element circuit. The pilot signal is utilized to introduce the same sort of constraints on the control loops 35 and 36 as to response to returns from various angles as a mainlobe filter in the embodiment of FIG. 1. In the present embodiment, weighting feedback to the control loops 35 and 36 is responsive to the vector elements $gi$. In FIG. 2, the same reference numerals are used to denote elements corresponding to those of FIG. 1. The antenna 20 consists of $k$ elements 21a, 21b, . . . 21k. In FIG. 2 however, the cross correlator control loops 35 and 36 are constructed as follows. An adder 83, multiplier 84, filter 85 and complex conjugate generator 86 are all connected in series from the terminal 41 to the weighting (other) input of the multiplier 23. Similarly, an adder 97, multiplier 94, filter 99 and complex conjugate generator 100 are connected in series from the terminal 42 to the weighting (other) input of the multiplier 24. The output of the complex conjugate generator 86 is coupled to a multiplier 101 which multiplies the weight by pilot signal element $gi$. The output of the multiplier 101 is coupled to a subtractive input of an adder 102 having an additive input from an adder 103 and a subtractive input from a multiplier 104, which multiplier 104 is connected to the output from the complex conjugate generator 100. The summing circuit 103 subtracts the feedback from the interface terminal 27 to a summation of the complex conjugate of the reference vector $b$ times the pilot signal vector $g$ for all of the element circuits, $\Sigma bi^*gi$. The output of the adder 102 is connected to an amplifier 105, whose output is coupled by a complex conjugate generator 106 to other input terminals of the multipliers 84 and 94. The vector $g$ is representative of a signal due to a group of moving targets near the look angle. To provide assumed target means, the $g$ vector is supplied from a computer 110 coupled to the output of the phase shift signal generator 78 responsive to aircraft velocity and antenna look angle.

The phase difference between each $gi$ and $gi+k$ is (approximately) the same as the PRI to PRI phase shift of a desired moving target. This phase shift is selected to be substantially 180° greater than clutter doppler phase shift. The notation $gi$ indicates a vector element added at an adder 83 where $i = 1$ for adder 83a, $i = 2$ for adder 83b, similarly for the rest of the vector elements through $i = k$ for adder 83k. The notation $gi+k$ is similarly indicative of vector elements supplied to the adders 97a, 97b, . . . 97 k. The vector element $g1+k$ is added to the adder 97a and the vector element $gm$ is added to the adder 97k. The vector elements $gi$ are each added to one adder 83, and the vectors $gi+k$ are each added to one adder 97.

Additionally, each vector element $gi$ is connected to a pilot signal generator 112. In the pilot signal generator 112, each vector element $gi$ is multiplied by one reference vector element $bi$ to provide the above-described summation $\Sigma bi^*gi$ to the adder 103 (where $bi$ is indicative of a value of an element of the vector $b$ for each element circuit). It is noted that one set of components adder 102, adder 103, amplifier 105, complex conjugate generator 106 and pilot signal generator 112 is provided for coupling to all the element circuits $a, b . . . k$.

In a manner somewhat similar to that of the circuit FIG. 1, where a high level of clutter is present, outputs of cross correlator control loops 35 and 36 tend to be canceled in the summation circuit 26. However, in the present circuit, mainlobe gain is maintained in response to compensation to the vector g in accordance with the present invention.

Figure 3:
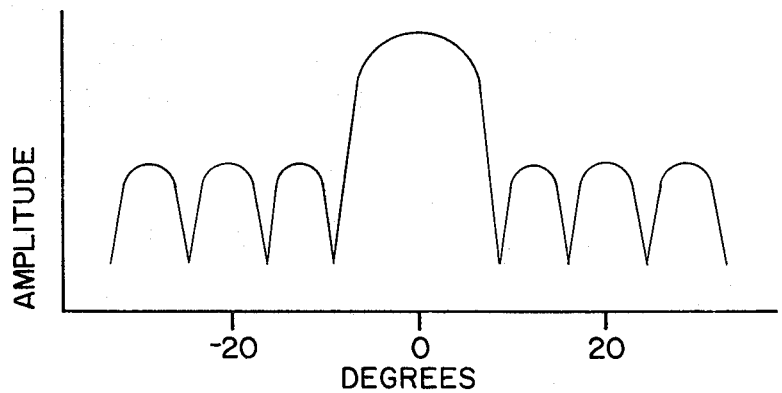
FIG. 3 is an antenna pattern representing an unadapted antenna pattern of a typical array.
Figure 4:
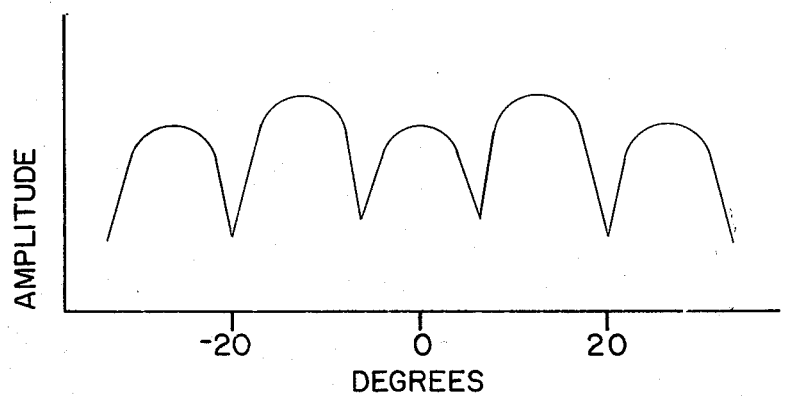
FIG. 4 is an antenna pattern representative of a typical adapted antenna receive pattern of a prior art adaptive AMTI array utilizing one delay line per element circuit.
Figure 5:
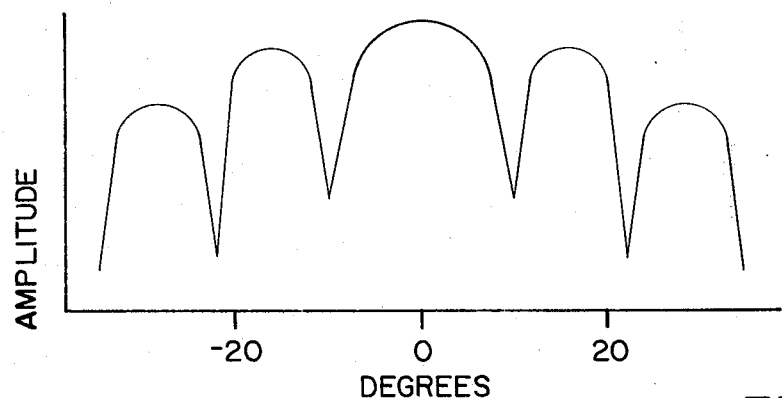
FIG. 5 is an antenna pattern representative of the adapted antenna receive pattern produced by the processor of the present invention.

The results of this operation are seen with respect to FIGS. 3, 4, and 5 in which 0° corresponds to the look angle. FIG. 3 is representative of an unadapted or quiescent antenna pattern for a typical array. A mainlobe has a particular width as determined by reference vector $b$, and the amplitude of the receive mainlobe is greater than that of side lobes. FIG. 4 is illustrative of a typical response of a single delay line per element prior art adaptive AMTI processor. Due to the presence of clutter, a fraction of the received clutter remaining in the feedback to the cross correlator control loops causes the contributions of element circuits to the antenna pattern to reduce the width of the mainlobe. Also, amplitude of the mainlobe is decreased. However, as illustrated in FIG. 5, in the context of the present invention, mainlobe amplitude and width can be maintained while clutter is cancelled since sensing of the presence of a simulated target maintains mainlobe gain. In other words, the control loops 35 and 36 are provided with a synthesized signal for controlling their gain within the desired interval about the look angle, preserving the desired pattern for coupling to the AMTI canceller 28.

In summary, AMTI circuits have been provided utilizing cross correlator control loops with feedback means for adjusting weights by which contributions of loops to a summing circuit signal are modified. Forms of the mainlobe filter and pilot signal generator are known in the art. The present invention provides an AMTI adaptive processing circuit in which mainlobe gain can be preserved and clutter cancellation provided while providing an output compatible with further signal processing circuitry. It should be noted that the circuitry of the present invention is directed only to the receiving function of a radar system, and does not affect the transmitting function. Transmission circuitry has not been illustrated since it is conventional, and well-known to those skilled in the art. Application of the present invention is not limited to adaptive AMTI processor circuits incorporating element circuits each including only one delay line. In accordance with the above teachings, array processors incorporating "three pulse" or other element circuits may also be utilized. A fuller mathematical description of the present invention is found in the paper cited in the introduction to the specification. Since relative phase shift of various input signals is a significant feature of the present invention, those skilled in the art will be able to make many mofifications to the particular circuitry disclosed in the specification to provide an adaptive AMTI processor constructed in accordance with the present invention.

What is claimed as new and desired to be secured by Letters Patent of the United States is:

1. An adaptive AMTI processor for receive-mode operation with an array antenna, comprising, in combination:

a plurality of element circuits connected, one each, to the respective antenna elements, each said circuit including a delay line arranged to receive the output from the antenna element, a pair of cross-correlator control loops connected respectively to the input and output of said delay line, weighting feedback means connected to said cross-correlator control loops and incorporating beam-forming circuit means operable to control the gain of said cross-correlator control loops to suppress signal returns incident upon said antenna from all directions other than the angle of a narrow arc centered about the antenna boresight, and phase shift means also incorporated in said weighting feedback means for introducing into the feedback signal path a phase shift approximately 180° greater than the phase difference between corresponding clutter return signals appearing at the input and output of said delay line;

an AMTI canceller circuit; and summing circuit means for combining all outputs from said cross-correlator control loops and passing the resultant signal to said AMTI canceller circuit for processing.

* * * * *